United States Patent
Clarkson et al.

(10) Patent No.: US 8,255,401 B2
(45) Date of Patent: Aug. 28, 2012

(54) COMPUTER INFORMATION RETRIEVAL USING LATENT SEMANTIC STRUCTURE VIA SKETCHES

(75) Inventors: Kenneth L. Clarkson, Madison, NJ (US); David P. Woodruff, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 12/769,358

(22) Filed: Apr. 28, 2010

(65) Prior Publication Data

US 2011/0270835 A1  Nov. 3, 2011

(51) Int. Cl.
G06F 17/16 (2006.01)
G06F 17/30 (2006.01)
G06F 7/58 (2006.01)
(52) U.S. Cl. .......... 707/737; 708/250; 708/520
(58) Field of Classification Search .......... 707/705, 707/708, 736, 737, 739; 708/250, 520
See application file for complete search history.

(56) References Cited

U.S. PATENT DOCUMENTS

| | | | |
|---|---|---|---|
| 4,839,853 A | 6/1989 | Deerwester | |
| 5,301,109 A | 4/1994 | Landauer | |
| 2003/0037073 A1 | 2/2003 | Tokuda | |
| 2003/0200097 A1* | 10/2003 | Brand | 704/500 |
| 2003/0217047 A1 | 11/2003 | Marchisio | |
| 2005/0165782 A1* | 7/2005 | Yamamoto | 707/7 |
| 2006/0025995 A1 | 2/2006 | Erhart | |
| 2006/0235661 A1 | 10/2006 | Price | |
| 2007/0233669 A2 | 10/2007 | Martin | |
| 2008/0114755 A1 | 5/2008 | Wolters | |
| 2008/0275834 A1* | 11/2008 | Zhong et al. | 706/46 |
| 2009/0037390 A1 | 2/2009 | Handley | |
| 2009/0282027 A1* | 11/2009 | Subotin et al. | 707/5 |

OTHER PUBLICATIONS

From Latent semantics to Spatial Hypertext—an intergrated Approach, Chaomei chen et al., the proceddings of $9^{th}$ ACM conference on Hypertext and Hypermedia, 98.*
P. Drineas, R. Kannan, and M. W. Mahoney. Fast Monte Carlo algorithms for matrices III: Computing a compressed approximate matrix decomposition. SIAM Journal on Computing, 36(1):184-206, 2006.
P. Drineas, M. W. Mahoney, and S. Muthukrishnan. Relative-error cur matrix decompositions. SIAM Journal on Matrix Analysis and Applications, 30(2):844-881, 2008.
Chew et al., Cross-Language Information Retrieval Using PARAFAC2, May 2007, SAND2007-2706.
Rishel et al., Augmentation of a term/document matrix with part-of-speech tags to improve accuracy of latent semantic analysis, Jun. 2006, ISSN: 1109-2750.

* cited by examiner

*Primary Examiner* — Hung T Vy
(74) *Attorney, Agent, or Firm* — Shimokaji & Assoc., PC

(57) ABSTRACT

A method, system and program product for computer information retrieval is disclosed. A matrix A is received. Random sign matrices S and R are generated. Matrix products of S^T*A, A*R, and S^T*A*R are computed. A Moore-Penrose pseudoinverse C of S^T*A*R is computed. A singular value decomposition is computed of the pseudoinverse C. Three matrices ARU, Sigma, and V^TS^TA are outputted as factorization in applications.

12 Claims, 4 Drawing Sheets

COMPUTER INFORMATION RETRIEVAL USING LATENT SEMANTIC STRUCTURE VIA SKETCHES

BACKGROUND

The present invention relates generally to information retrieval, and more specifically, to computer information retrieval using latent semantic structure via sketches.

Sketching involves computing a small number of random linear combinations of rows or columns of matrices. Current algorithms for numerical linear algebra take varying approaches and have varied success in terms of speed and error.

Hence, there is a need for a more efficient system and method for computer information retrieval using latent semantic structure via sketches.

SUMMARY

According to one embodiment of the present invention, a method comprises computer information retrieval using latent semantic structure via sketches, the retrieval comprising: receiving an input n×d matrix A with a computer; receiving an input parameter k; receiving a small constant eps, where eps is greater than zero; generating a random d×(k/eps) sign matrix R; generating a random n×(k/eps^2) sign matrix S; computing a matrix product A*R; computing a matrix product S^T*A, where S^T is (k/eps^2)×n matrix, and where S^T_{i,j}=S_{j,i}); computing S^T*A*R; computing the Moore-Penrose pseudoinverse C of S^T*A*R; computing the singular value decomposition U*Sigma*V^T of C, where U is (k/eps)×(k/eps), Sigma is (k/eps) by (k/eps), and V is (k/eps^2)×(k/eps); and outputting the three matrices ARU, Sigma, and V^TS^TA as factorization in applications.

In another embodiment of the present invention, a system comprising: a computer including a computer processor for information retrieval; a processing engine for finding a decomposition of a term-document matrix A, the finding comprising: obtaining a matrix (S^TAR), wherein S comprises an n×k/eps^2 matrix with random entries with values selected from the set {−1, +1}, wherein eps comprises an error parameter; producing AR; acquiring S^TA; and a computer display for outputting (AR)U'Sigma(V^T)'(S^TA), wherein U'Sigma(V^T)' comprises the singular value decomposition (SVD) of the pseudoinverse of (S^TAR).

In an embodiment of the present invention, a computer program product for computer information retrieval using latent semantic structure via sketches, comprising: a computer readable storage medium having computer readable code embodied therewith, the computer readable program code including: computer readable code performed on a computer that receives an input n×d matrix A; computer readable code that receives an input parameter k; computer readable code that represents each row n as a term and each column d as a document; computer readable code that replaces the matrix A with a function of the matrix A; computer readable code that receives a small constant eps, where eps is greater than zero; computer readable code that generates a random d×(k/eps) sign matrix R; computer readable code that generates a random n×(k/eps^2) sign matrix S; computer readable code that computes a matrix product A*R; computer readable code that computes a matrix product S^T*A, where S^T is (k/eps^2)×n matrix where S^T_{i,j}=S_{j,i}); computer readable code that computes S^T*A*R; computer readable code that computes the Moore-Penrose pseudoinverse C of S^T*A*R; computer readable code that computes the singular value decomposition U*Sigma*V^T of C, where U is (k/eps)×(k/eps), Sigma is (k/eps) by (k/eps), and V is (k/eps^2)×(k/eps); and outputting the three matrices ARU, Sigma, and V^TS^TA as factorization in applications.

The descriptions, advantages, and features presented herein are of representative embodiments only, and are not exhaustive and/or exclusive. They are presented only to assist in understanding the invention. It should be understood that they are not representative of all the inventions defined by the claims. They are not to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims. These and other features, aspects and advantages of the present invention will become better understood with reference to the following drawings, description and claims.

DETAILED DESCRIPTION

Figure 1:
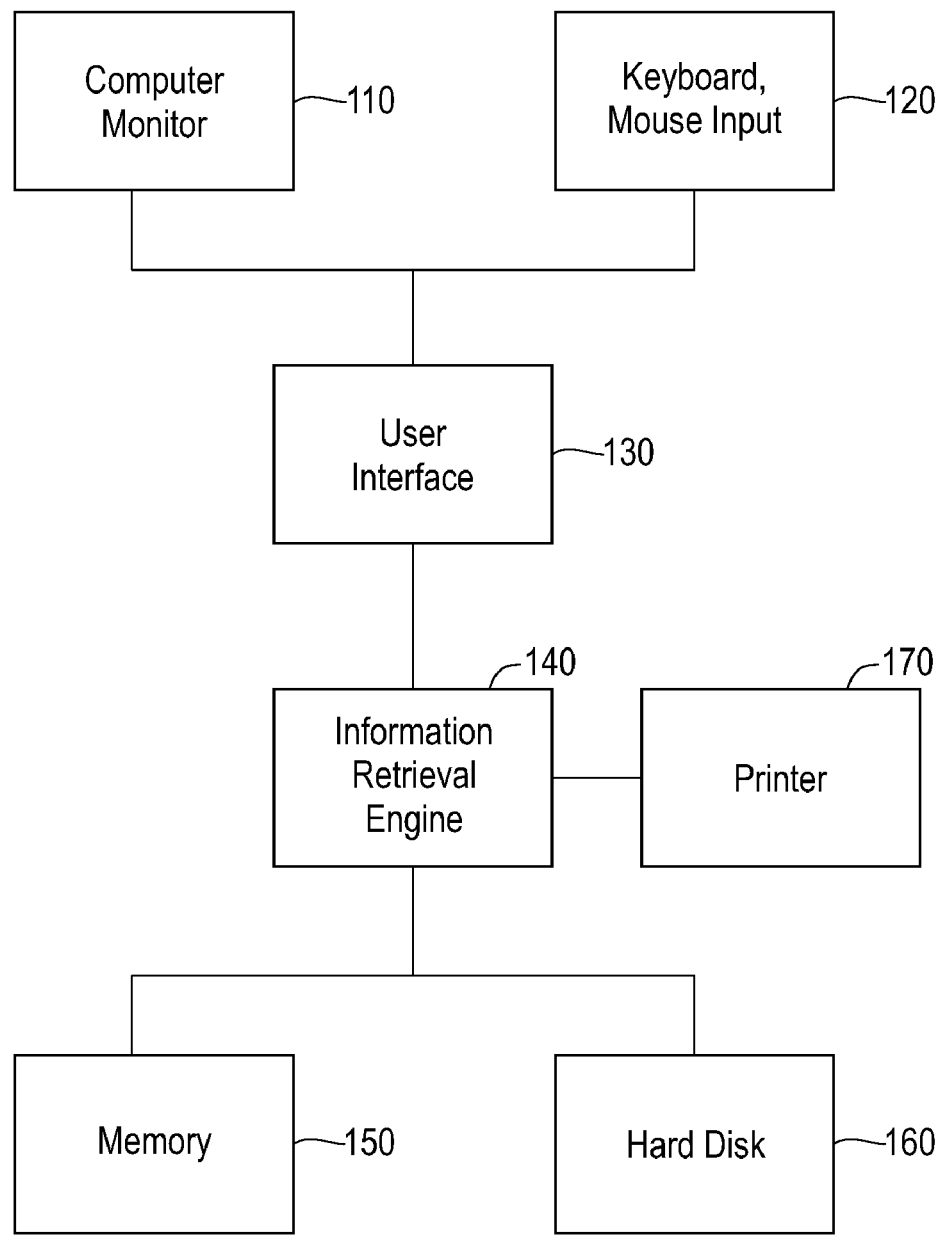
FIG. 1 is a block diagram of a system according to one exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is defined by the appended claims.

Various inventive features are described below, for example a means to find a decomposition of a term-document matrix, that can each be used independently of one another or in combination with other features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer-readable program code embodied thereon.

Any combination of one or more computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction performing system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA (JAVA is a registered trademark of Sun Microsystems), Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

FIG. 1 is a block diagram of a system 100 according to an exemplary embodiment of the invention. The system 100 may include a computer monitor 110, a keyboard and mouse 120, a user interface 130, processing engine 140, memory 150, a hard disk 160, and a printer 170.

A user may utilize the invention by using the user interface 130 displayed on the computer monitor 110 and operating the user interface 130 with the keyboard and mouse 120. The user may utilize the system 100 by inputting data and functions from the user interface 130 for processing by the processing engine 140. The user interface 130 and the processing engine 140 may be stored in computer random access memory 150 and on a hard disk 160. The processing engine 140 may be processed by a computer processor on a computer. The user may also print operations from the user interface 130 on the printer 170.

Figure 2:
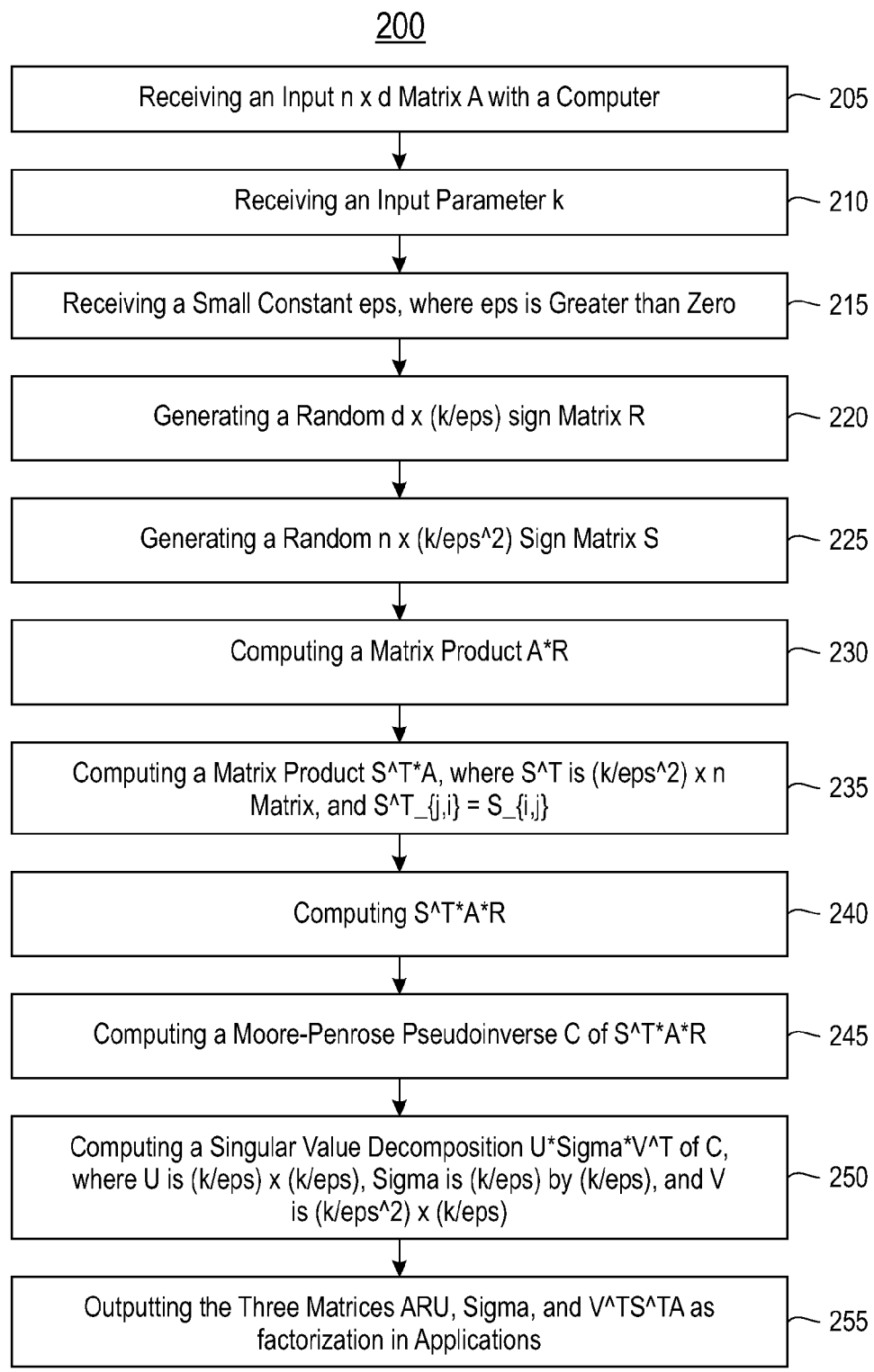
FIG. 2 is a flowchart of an exemplary embodiment of the invention.

Exemplary processing in the system 100 of FIG. 1 is shown in FIG. 2. FIG. 2 illustrates an exemplary embodiment of the invention 200 showing computer information retrieval using latent semantic structure via sketches.

As shown in FIG. 2, a method of computer information retrieval using latent semantic structure via sketches for the processing engine of FIG. 1 may include a step 205 of receiving an input n×d matrix A with a computer. A step 210 may include receiving an input parameter k. A step 215 may include receiving a small constant eps, where eps is greater than zero. A step 220 may include generating a random d×(k/eps) sign matrix R. A step 225 may include generating a random n×(k/eps^2) sign matrix S. A step 230 may include computing a matrix product A*R. A step 235 may include computing a matrix product S^T*A, where S^T is (k/eps^2)×n matrix, and S^T_{I,j}=S{i,j}. A step 240 may include computing S^T*A*R. A step 245 may include computing a Moore-Penrose pseudoinverse C of S^T*A*R. A step 250 may include computing a singular value decomposition U*Sigma*V^T of C, where U is (k/eps)×(k/eps), Sigma is (k/eps) by (k/eps), and V is (k/eps^2)×(k/eps). A step 255 may include outputting the three matrices ARU, Sigma, and V^TS^TA as factorization in applications. The outputting 255 may be done for example on a computer display, monitor, or printer.

In possible embodiments the factorization may be used instead of singular value decomposition of A in latent semantic indexing applications. The entries in the sign matrices R and S may be generated using a cryptographic random number generator. The entries in the sign matrices R and S may be generated from a distribution with limited independence. The entries in the sign matrices R and S may be generated from a family of degree-r polynomials for a low value of r that is determined in practice. The input n×d matrix A may be specified row by row, where one sees entries of A in an arbitrary order, and an entry undergoes multiple updates. Each row n may be represented as a term and each column as a document.

The input n×d matrix A may be specified in a stream online, where one sees entries of A in an arbitrary order, and an entry undergoes multiple updates. The matrices may be multiplied in subroutines using standard matrix multiplication, Strassen's algorithm, and/or the Coppersmith algorithm. The matrix A may be replaced with a function of the matrix A. Documents may be compared across different languages, after analyzing a base set of translated documents.

In another possible embodiment, documents may be clustered based on their cosine similarity in the concept space. After producing the factorization (ARU)*Sigma*(V^T-S^TA), given a document d_j, the vector Sigma^{-1}*(ARU)^T*d_j may be computed. Given another document d'_j, the vector Sigma^{-1}*(ARU)^T*d_j may be computed. The two computed vectors may be compared using the angle between them.

Figure 3:
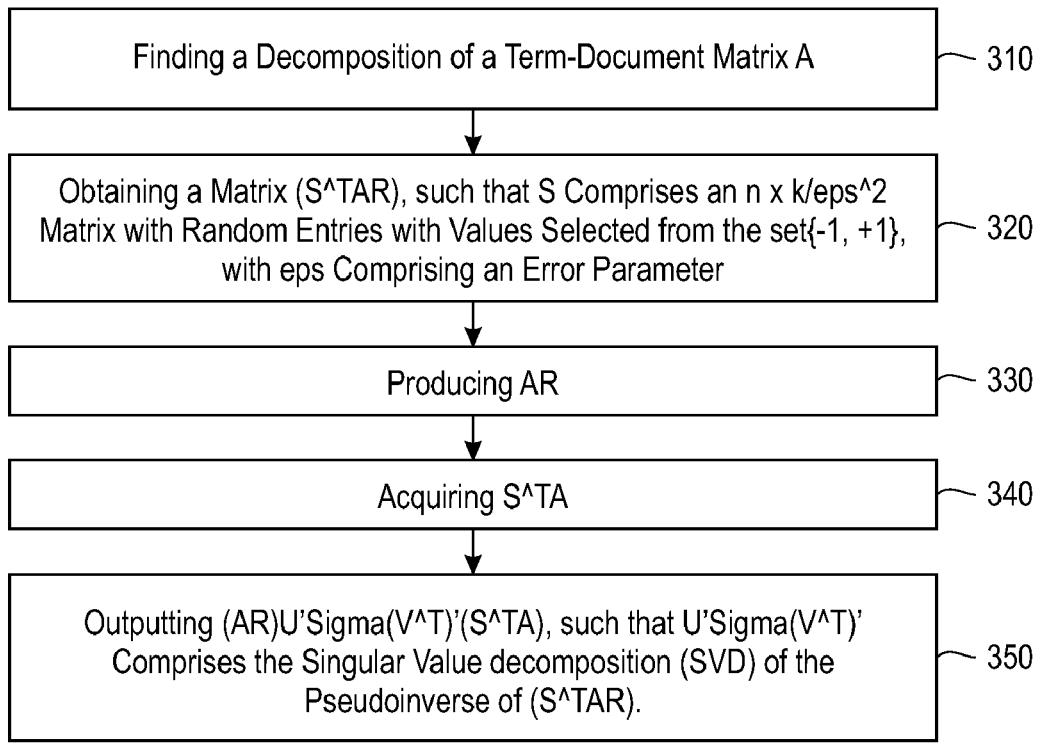
FIG. 3 is a flowchart of an exemplary embodiment of the invention in FIG. 2, showing an acquiring of S^TA.

Exemplary processing in the system 100 of FIG. 1 may be described with reference to FIG. 3. FIG. 3 is a flowchart of an exemplary embodiment of the invention 300 shown in FIG. 2, showing an acquiring of S^TA.

As shown in FIG. 3, a step 310 may include finding a decomposition of a term-document matrix A by steps 320-350. A step 320 may include obtaining a matrix (S^TAR), such that S comprises an n×k/eps^2 matrix with random entries with values selected from the set {−1, +1}, with eps comprising an error parameter. A step 330 may include producing AR. A step 340 may include acquiring S^TA. A step 350 may include outputting (AR)U'Sigma(V^T)'(S^TA), such that U'Sigma(V^T)' comprises the singular value decomposition (SVD) of the pseudoinverse of (S^TAR). The outputting 350 may be done for example on a computer display, monitor, or printer.

In another possible embodiment, the factorization of the matrix A may be computed into three matrices, (ARU)*Sigma*(V^TS^TA). A plurality of diagonal entries may be dropped from Sigma. A number to drop may be determined based on an application.

In another possible embodiment, the matrix A may be shared by two entities, the first of which may have a subset of the entities, with the second having a remaining subset. The entities of the matrix A may be locally sketched. The sketches may be communicated to perform factorization and faster latent semantic analysis. The communication is reduced by sending the sketches rather than the missing matrix entries of an entity.

In another possible embodiment, a Moore Penrose pseudo-inverse computation may be computed using one or more of: an iterative method of Ben-Israel and Cohen, approximate matrix multiplication, Strassen's algorithm, Coppersmith's algorithm, and Winograd's algorithm.

Figure 4:
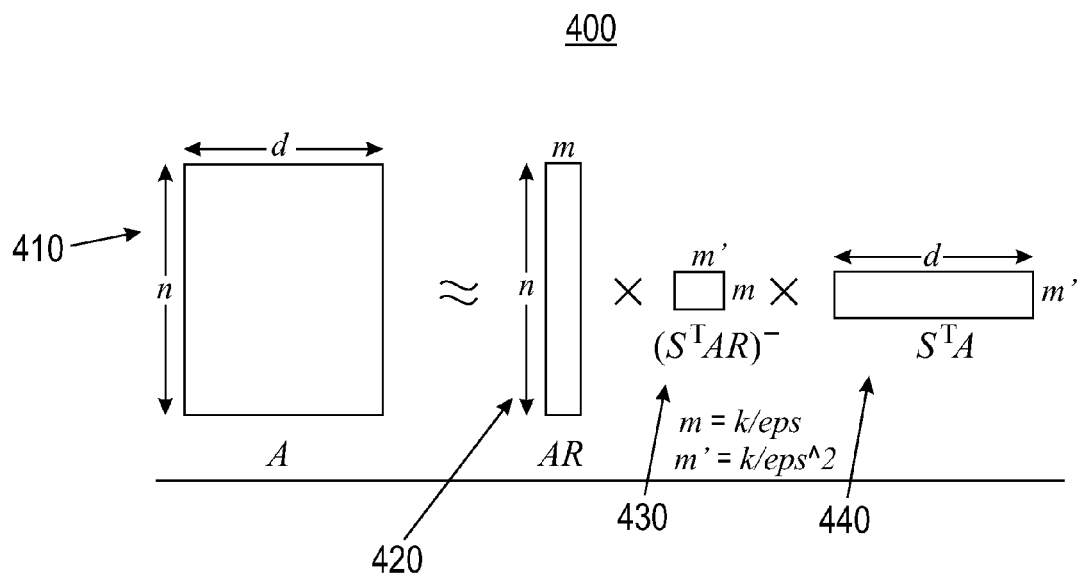
FIG. 4 is an exemplary block diagram of the invention showing for a matrix A, the computation of S^T*A, S^T*A*R, and A*R.

Exemplary user interface processing in the system 100 of FIG. 1 may be understood with reference to FIG. 4. FIG. 4 is an exemplary block diagram of the invention 400 shown in FIG. 2, showing for a matrix A, the computation of S^T*A, S^T*A*R, and A*R.

As shown in FIG. 4, a matrix A 410 may be input. A matrix product 420 S^TA may be computed. A matrix product 430 S^T*A*R may be computed. A matrix product 440 A*R may be computed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Example embodiments may be performed with or without query processing.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A method comprising:
   computer information retrieval using latent semantic structure via sketches, the retrieval comprising:
   receiving an input n×d matrix A with a computer;
   receiving an input parameter k;
   receiving a small constant eps, where eps is greater than zero;
   generating a random d×(k/eps) sign matrix R;
   generating a random n×(k/eps^2) sign matrix S;
   computing a matrix product A*R;
   computing a matrix product S^T*A, where S^T is (k/eps^2)×n matrix, and where S^T_{i,j}=S_{j,i});
   computing S^T*A*R;
   computing the Moore-Penrose pseudoinverse C of S^T*A*R;
   computing the singular value decomposition U*Sigma*V^T of C, where U is (k/eps)×(k/eps), Sigma is dimensional matrix (k/eps) by (k/eps), and V is (k/eps^2)×(k/eps); and
   outputting the three matrices ARU, Sigma, and V^TS^TA as factorization in applications.

2. The method of claim 1, wherein the factorization is used instead of singular value decomposition of A in latent semantic indexing applications.

3. The method of claim 1, wherein the entries in the sign matrices R and S are generated using a cryptographic random number generator.

4. The method of claim 1, wherein the entries in the sign matrices R and S are generated from a distribution with limited independence.

5. The method of claim 1, wherein the entries in the sign matrices R and S are generated from a family of degree-r polynomials for a low value of r that is determined in practice.

6. The method of claim 1, wherein the input n×d matrix A is specified row by row, where one sees entries of A in an arbitrary order, and an entry undergoes multiple updates.

7. The method of claim 1, wherein the input n×d matrix A is specified in a stream online, where one sees entries of A in an arbitrary order, and an entry undergoes multiple updates.

8. The method of claim 1, wherein matrices are multiplied in the subroutines using at least one of: standard matrix multiplication, and Stassen's algorithm.

9. The method of claim 1, wherein matrices are multiplied in the subroutines using the Coppersmith algorithm.

10. A computer program product for computer information retrieval using latent semantic structure via sketches, comprising:
  a computer non-transitory readable storage medium having computer readable code embodied therewith, the computer readable program code including:
  computer readable code performed on a computer that receives an input n×d matrix A;
    computer readable code that receives an input parameter k;
  computer readable code that represents each row n as a term and each column d as a document;
  computer readable code that replaces the matrix A with a function of the matrix A;
  computer readable code that receives a small constant eps, where eps is greater than zero;
    computer readable code that generates a random d×(k/eps) sign matrix R;
    computer readable code that generates a random n×(k/eps$^2$) sign matrix S;
    computer readable code that computes a matrix product A*R;
    computer readable code that computes a matrix product S^T*A, where S^T is (k/eps$^2$)×n matrix where S^T_{i,j}=S_{j,i});
    computer readable code that computes S^T*A*R;
    computer readable code that computes the Moore-Penrose pseudoinverse C of S^T*A*R;
    computer readable code that computes the singular value decomposition U*Sigma*V^T of C, where U is (k/eps)×(k/eps), Sigma is dimensional matrix (k/eps) by (k/eps), and V is (k/eps$^2$)×(k/eps); and
  outputting the three matrices ARU, Sigma, and V^TS^TA as factorization in applications.

11. The computer program product of claim 10, including:
  computer readable code that clusters documents based on their cosine similarity in the concept space;
    computer readable program code that computes Sigma^{-1}*(ARU)^T*d_j, given a document d_j, which is a vector; and
    computer readable program code that computes Sigma^{-1}*(ARU)^T*d'_j, given a document d'_j; and
  computer readable program code that compares the two computed vectors using the angle between them.

12. The computer program product of claim 10, wherein the documents are compared across different languages, after analyzing a base set of translated documents.

\* \* \* \* \*